United States Patent
Toyota

(10) Patent No.: US 12,353,073 B2
(45) Date of Patent: Jul. 8, 2025

(54) ANTI-PEEPING SYSTEM, OPTICAL LAMINATE, DISPLAY DEVICE, AND ANTI-PEEPING METHOD

(71) Applicant: NITTO DENKO CORPORATION, Ibaraki (JP)

(72) Inventor: Yuji Toyota, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 236 days.

(21) Appl. No.: 17/915,710

(22) PCT Filed: Mar. 26, 2021

(86) PCT No.: PCT/JP2021/013052
§ 371 (c)(1),
(2) Date: Sep. 29, 2022

(87) PCT Pub. No.: WO2021/200723
PCT Pub. Date: Oct. 7, 2021

(65) Prior Publication Data
US 2023/0131221 A1  Apr. 27, 2023

(30) Foreign Application Priority Data
Mar. 31, 2020 (JP) ................................. 2020-064553

(51) Int. Cl.
*G02F 1/13* (2006.01)
*G02F 1/1335* (2006.01)
*G02F 1/13363* (2006.01)

(52) U.S. Cl.
CPC ...... *G02F 1/1323* (2013.01); *G02F 1/133531* (2021.01); *G02F 1/133638* (2021.01)

(58) Field of Classification Search
CPC ............ G02F 1/1323; G09G 2320/068; G09G 2320/028; G09G 2358/00
See application file for complete search history.

(56) References Cited

U.S. PATENT DOCUMENTS 6,262,843 B1 * 7/2001 Marx ..................... G02B 27/28
  52/27
9,547,112 B2   1/2017 Mead et al.
(Continued)

FOREIGN PATENT DOCUMENTS

JP   2009-175685 A   8/2009
JP   2014-170019 A   9/2014
(Continued)

OTHER PUBLICATIONS

Office Action dated Feb. 6, 2024, issued in counterpart JP Application No. 2022-512149, with English translation. (13 pages).
(Continued)

*Primary Examiner* — Alexander P Gross
(74) *Attorney, Agent, or Firm* — WHDA, LLP

(57) ABSTRACT

A peeking prevention system includes: a display device having a display plane emitting polarized light; a partition to delimit from the surroundings a space in which displaying is to be provided by the display device, the partition having a light-transmitting portion through which the inside of the space is viewable; and an optical stack opposed to the display plane of the display device. The light-transmitting portion includes a transparent substrate and a first polarizing layer having a first absorption axis that is parallel to a first direction. The optical stack includes a second polarizing layer having a second absorption axis that is parallel to a second direction, the second direction being orthogonal to the first direction, and a first phase difference layer at a side of the second polarizing layer facing the display plane. The first phase difference layer has an in-plane retardation of 4000 nm or more.

16 Claims, 12 Drawing Sheets

(56) References Cited

U.S. PATENT DOCUMENTS

2011/0019274 A1* 1/2011 Kobayashi .......... G02B 5/3025
359/485.01
2015/0247962 A1 9/2015 Mead et al.
2016/0334633 A1 11/2016 Asanoi et al.

FOREIGN PATENT DOCUMENTS

| JP | 2015-132093 A | | 7/2015 |
|----|---------------|---|--------|
| JP | 2016-224274 A | | 12/2016 |
| JP | 2017-124621 A | | 7/2017 |
| JP | 2017161599 A | * | 9/2017 |
| JP | 2019-045834 A | | 3/2019 |

OTHER PUBLICATIONS

International Search Report dated Jun. 8, 2021, issued in counterpart International application No. PCT/JP2021/013052, with English translation. (7 pages).
Written Opinion dated Jun. 8, 2021, issued in counterpart International application No. PCT/JP2021/013052, with English translation. (13 pages).

* cited by examiner

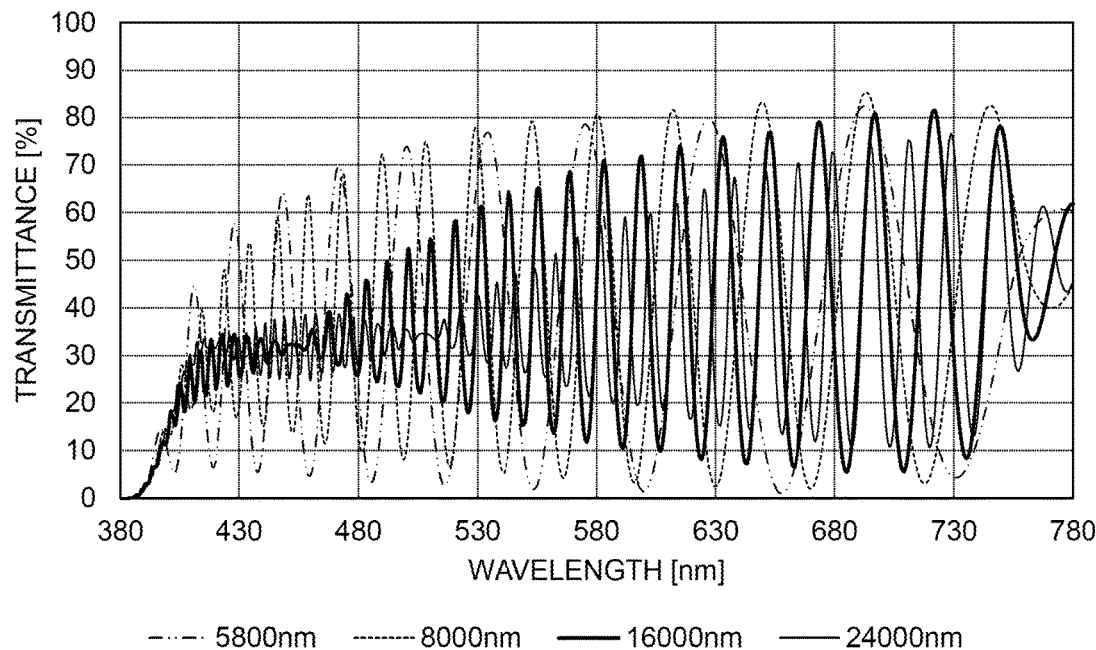
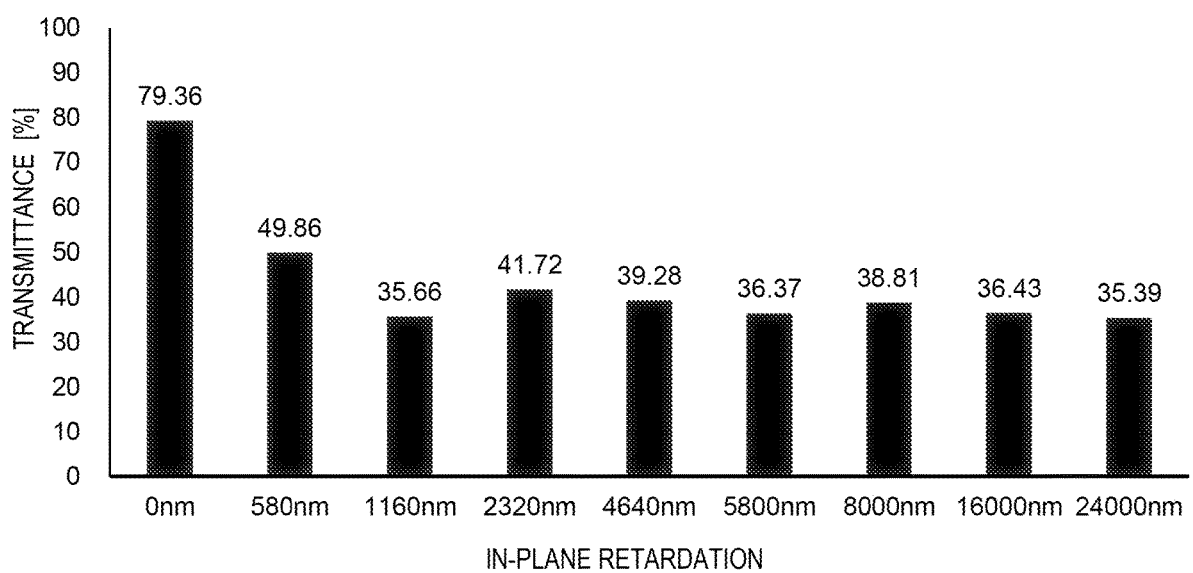

ANTI-PEEPING SYSTEM, OPTICAL LAMINATE, DISPLAY DEVICE, AND ANTI-PEEPING METHOD

TECHNICAL FIELD

The present invention relates to a peeking prevention system and a method of peeking prevention, as well as an optical stack and a display device suitable for use therewith.

BACKGROUND ART

Display devices that use polarized light to perform displaying, such as liquid crystal display devices, are widely used. Large-sized display devices are often installed in conference rooms as monitors for presentation or video conferencing purposes, for example.

On the other hand, the use of open conference rooms that provide a sense of spatial openness is becoming more widespread. For example, the walls (or partitions) of a conference room may be made of glass panels (or acrylic panels) to provide a sense of openness because of their transparency. While transparency of the walls provides a sense of openness, it can be a problem if an outside stranger peeks at the information that is being displayed on a display device in the conference room. To cope with this situation, for example, frosted glass or colored panels are used to make the transparent walls opaque at eye level. However, when the transparent walls are partly made opaque in this way, the sense of openness will be compromised.

Patent Document 1 discloses a system where a polarizing filter that absorbs polarized light in a direction parallel to the polarization direction of polarized light which is emitted from a display device (i.e., a polarizing filter that transmits polarized light in a direction orthogonal to the polarization direction of polarized light which is emitted from the display device) is placed close to a transparent window, thereby preventing the information that is displayed on the display device from being seen from the outside, while still allowing the inside of the room to be seen through the transparent window.

CITATION LIST

Patent Literature

[Patent Document 1] US Patent Application Publication No. 2015/0247962 (the specification of USP No. 9547112)

SUMMARY OF INVENTION

Technical Problem

However, the system described in Patent Document 1 may not provide for convenience in some cases. What can be prevented from being seen from the outside in the system described in Patent Document 1 is only the information that is displayed by using light being polarized in a direction parallel to the absorption axis of the polarizing filter that is provided on the window. That is, the system described in Patent Document 1 cannot prevent peeking by a stranger from the outside when a display device is used that emits light being polarized in directions not parallel to the absorption axis of the polarizing filter.

The present invention has been made in view of the above problems, and an objective thereof is to provide a peeking prevention system and a method of peeking prevention with improved convenience, as well as an optical stack and a display device suitable for use therewith.

Solution to Problem

According to embodiments of the present invention, means for solution as recited in the following Items are provided.

[Item 1]
A peeking prevention system comprising:
a display device having a display plane from which to emit polarized light;
a partition to delimit from surroundings a space in which displaying is to be provided by the display device, the partition having a light-transmitting portion through which the inside of the space is viewable; and
an optical stack opposed to the display plane of the display device, wherein,
the light-transmitting portion includes a transparent substrate and a first polarizing layer, the first polarizing layer having a first absorption axis that is parallel to a first direction;
the optical stack includes
a second polarizing layer having a second absorption axis that is parallel to a second direction, the second direction being orthogonal to the first direction, and
a first phase difference layer disposed at a side of the second polarizing layer facing the display plane; and
the first phase difference layer has an in-plane retardation of 4000 nm or more.

[Item 2]
The peeking prevention system of Item 1, wherein the optical stack further includes a protection layer disposed at an opposite side of the second polarizing layer from the first phase difference layer.

[Item 3]
The peeking prevention system of Item 1 or 2, wherein the optical stack is disposed with an air layer between itself and the display device.

[Item 4]
The peeking prevention system of any of Items 1 to 3, wherein,
the display device includes a third polarizing layer on a front surface of the display plane; and
the third polarizing layer has a third absorption axis that is parallel to a third direction, the third direction not being orthogonal to the first direction.

[Item 5]
The peeking prevention system of Item 4, wherein the third direction is parallel to the first direction.

[Item 6]
The peeking prevention system of Item 4, wherein an angle made by the third direction and the first direction is 45°.

[Item 7]
The peeking prevention system of any of Items 4 to 6, wherein the display device further includes a ¼ wave plate interposed between the third polarizing layer and a display medium layer or an emission element layer.

[Item 8]
The peeking prevention system of any of Items 4 to 7, wherein the optical stack is bonded to the third polarizing layer via an adhesion layer.

[Item 9]
The peeking prevention system of any of Items 1 to 3, wherein, the display device includes a second phase difference layer on a front surface of the display plane; and the display device further includes a third polarizing layer interposed between a display medium layer and the second phase difference layer.

[Item 10]

The peeking prevention system of Item 9, wherein the optical stack is bonded to the second phase difference layer via an adhesion layer.

[Item 11]

The peeking prevention system of any of Items 1 to 10, wherein an angle made by a slow axis of the first phase difference layer and the second direction is not less than 35° and not more than 55°.

[Item 12]

The optical stack for use in the peeking prevention system of any of Items 1 to 11.

[Item 13]

An optical stack comprising:
a polarizing layer;
a phase difference layer disposed at a side of one principal face of the polarizing layer; and
a protection layer disposed at an opposite side of the polarizing layer from the phase difference layer, wherein
the phase difference layer has an in-plane retardation of 4000 nm or more.

[Item 14]

The optical stack of Item 13, wherein an angle made by a slow axis of the phase difference layer and an absorption axis of the polarizing layer is not less than 35° and not more than 550.

[Item 15]

A display device comprising:
a display medium layer or an emission element layer;
two polarizing layers disposed at a viewer's side of the display medium layer or emission element layer; and
a first phase difference layer being interposed between the two polarizing layers and having an in-plane retardation of 4000 nm or more.

[Item 16]

The display device of Item 15, further comprising a second phase difference layer interposed between: one of the two polarizing layers that is closer to the display medium layer or emission element layer; and the first phase difference layer.

[Item 17]

The display device of Item 15, further comprising a ¼ wave plate interposed between the display medium layer or emission element layer and the two polarizing layers.

[Item 18]

A method of peeking prevention for use with a peeking prevention system that includes:
a display device; and
a partition to delimit from surroundings a space in which displaying is to be provided by the display device, the partition having a light-transmitting portion through which the inside of the space is viewable,
the light-transmitting portion including: a transparent substrate; and a first polarizing layer being disposed at a side of the transparent substrate facing the space and having a first absorption axis parallel to a first direction, wherein the method comprises
disposing an optical stack so as to be opposed to a display plane of the display device, to reduce a transmittance when the display plane is viewed through the light-transmitting portion, the optical stack including: a second polarizing layer having a second absorption axis that is parallel to a second direction, the second direction being orthogonal to the first direction; and a phase difference layer being disposed at a side of the second polarizing layer facing the display plane and having an in-plane retardation of 4000 nm or more.

Advantageous Effects of Invention

According to embodiments of the present invention, there is provided a peeking prevention system and a method of peeking prevention with improved convenience, as well as an optical stack and a display device suitable for use therewith.

BRIEF DESCRIPTION OF DRAWINGS

FIG. 6B A graph showing wavelength dependence of transmittance in Experimental Example 2.

FIG. 6C A graph showing mean values of transmittance across the entire visible light region (from 380 nm to 780 nm) in Experimental Example 2.

DESCRIPTION OF EMBODIMENTS

Hereinafter, with reference to the drawings, a peeking prevention system and a method of peeking prevention, as well as an optical stack and a display device suitable for use therewith, according to embodiments of the present invention will be described. Embodiments of the present invention are not limited to what will be illustrated hereinbelow.

Figure 1A:
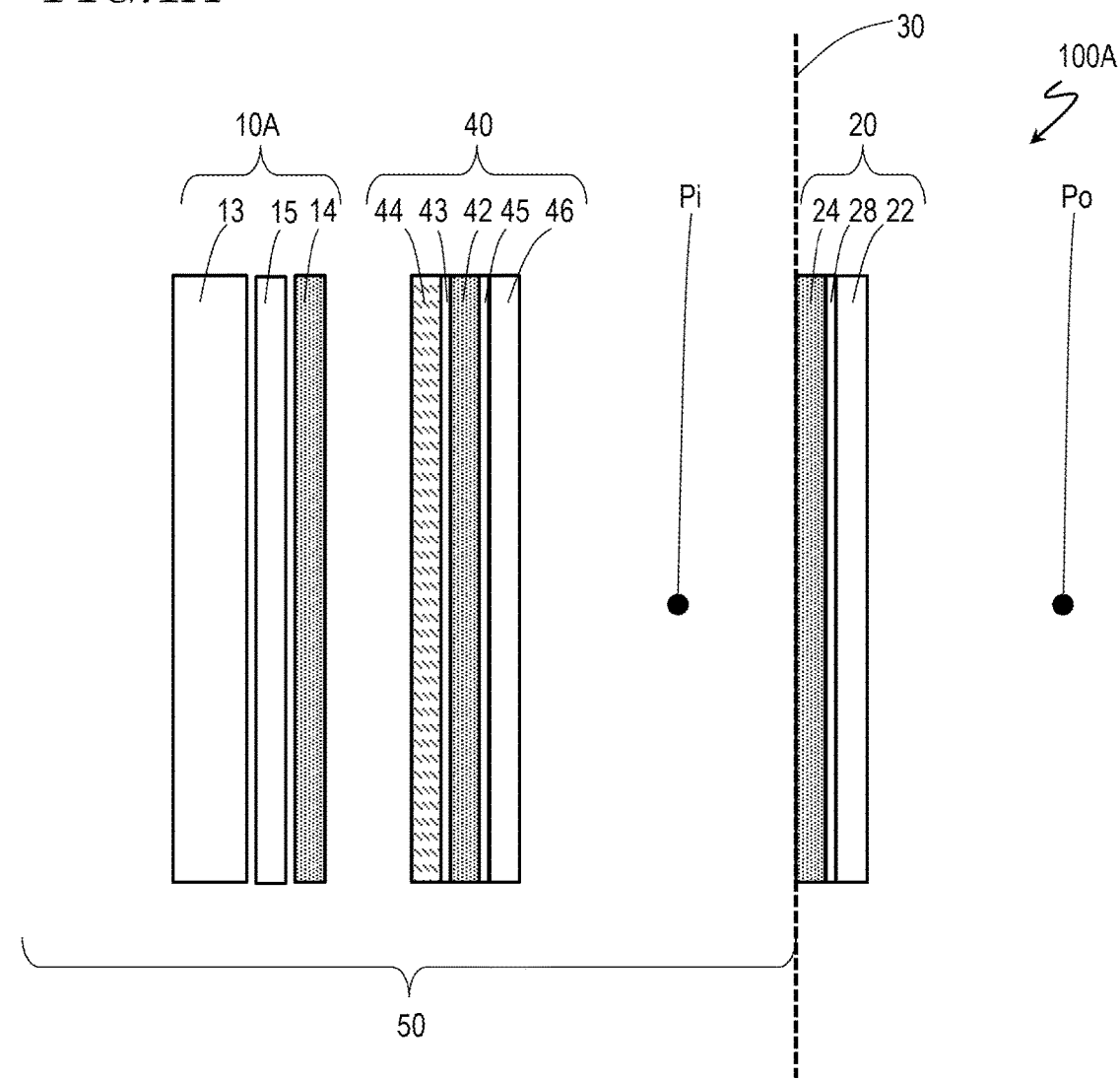
FIG. 1A A schematic plan view showing a peeking prevention system 100A according to an embodiment of the present invention as seen from above.
Figure 1B:
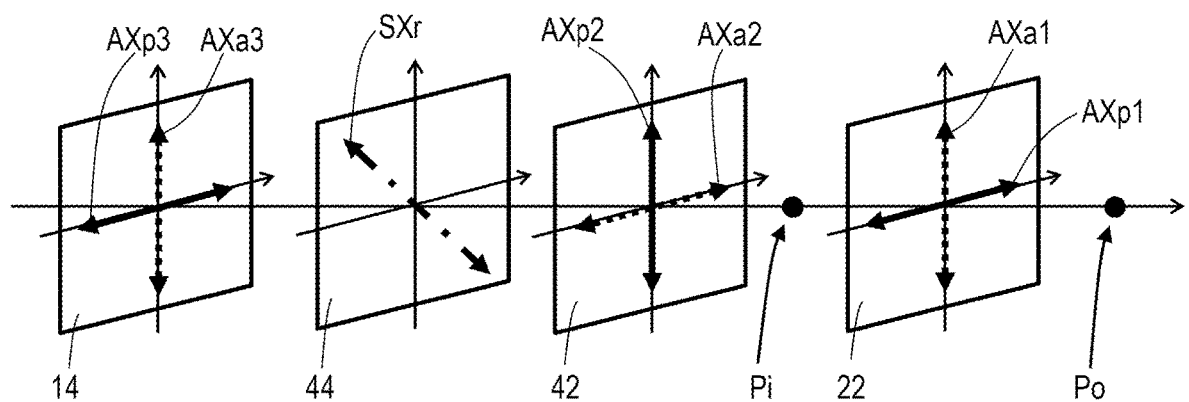
FIG. 1B A schematic diagram showing a manner in which polarized light emitted from a display device 10A is transmitted through a phase difference layer and polarizing layers.

FIG. 1A is a schematic plan view showing a peeking prevention system 100A according to an embodiment of the present invention as seen from above. FIG. 1B is a schematic diagram showing a manner in which polarized light emitted from a display device 10A is transmitted through a phase difference layer and polarizing layers.

As shown in FIG. 1A, the peeking prevention system 100A includes: a display device 10A to emit polarized light from a display plane; a partition 30 to delimit from the surroundings a space 50 in which displaying is to be provided by the display device 10A, the partition 30 having a light-transmitting portion 20 through which the inside of the space 50 is viewable; and an optical stack 40 opposed to the display plane of the display device 10A. Hereinafter, for simplicity, the display plane may be denoted by the same reference numeral 10A as the display device. The display device which is included in the peeking prevention system according to an embodiment of the present invention may be any that emits polarized light, irrespective of the polarization state of the polarized light being emitted. The polarized light which is emitted from a display device included in a peeking prevention system according to an embodiment of the present invention may be linearly polarized light, circularly polarized light, or elliptically polarized light, and when being linearly polarized light or elliptically polarized light is intended to be light having a degree of polarization of 70% or more. Herein, as the display device 10A, an LED display device 10A that emits linearly polarized light will be illustrated.

The light-transmitting portion 20 includes: a transparent substrate 22; and a first polarizing layer 24 having a first absorption axis AXa1 (see FIG. 1B) that is parallel to a first direction. The optical stack 40 includes: a second polarizing layer 42 having a second absorption axis AXa2 (see FIG. 1B) that is parallel to a second direction, which is orthogonal to the first direction; and a phase difference layer (which may be referred to as a "first phase difference layer") 44 disposed at a side of the second polarizing layer 42 facing the display plane 10A. When it is said that the first direction and the second direction are orthogonal, it is meant that the angle made by the first direction and the second direction has a margin of error within ±10° from 90°. The phase difference layer 44 has an in-plane retardation of 4000 nm or more, thus being able to reduce the degree of polarization of (i.e., depolarize) polarized light having a polarization direction that intersects the slow axis of the phase difference layer 44. The angle made by the slow axis of the phase difference layer 44 and the polarization direction of polarized light which is incident on the phase difference layer 44 is preferably not less than 35° and not more than 55°, and most preferably 45°. In the present specification, an angle made by a given axis (an absorption axis, a polarization axis, or a slow axis; "first axis") and another axis (an absorption axis, a polarization axis, or a slow axis that is different from the first axis; "second axis") has the following meaning, given that a smaller angle and a larger angle emerge as a result of a straight line parallel to the first axis intersecting a straight line parallel to the second axis, any such angle being represented by a value of 0 or more: the smaller angle.

As will be described with reference also to FIG. 1B below, the peeking prevention system 100A includes the optical stack 40, which prevents information from being seen from the outside, such information being displayed with not only light being polarized in a direction parallel to the first absorption axis of the first polarizing layer 24 that is provided in the light-transmitting portion 20, but also any other polarized light.

In this example, the LED display device 10A includes a polarizing layer (which may be referred to as the "third polarizing layer" or the "front-side polarizing layer") 14 at the front surface of the display plane. The front-side polarizing layer 14 has a third absorption axis AXa3 that is parallel to a third direction. Herein, it is assumed that the third absorption axis AXa3 has an azimuth angle of 90°. When the display plane 10A as viewed by a viewer is regarded as a clock face, the azimuth angle is 0° at 3 o'clock and reads positive counterclockwise. The LED display device 100A further includes: an emission element layer 13 including a plurality of light-emitting elements; and a λ/4 layer (¼ wave plate) 15 which is interposed between the front-side polarizing layer 14 and the emission element layer 13. The front-side polarizing layer 14 and the λ/4 layer 15 together function as a circular polarizer. The emission element layer 13 includes a light-emitting elements which are arranged in a two-dimensional array. The LED display device 10B is, for example, an organic EL display device 10B having an organic EL layer 13 that includes a plurality of organic EL elements. Alternatively, the LED display device 10B may have an emission element layer 13 that includes a plurality of LED chips (micro LEDs).

In this example, the azimuth angle of the first absorption axis AXa1 of the first polarizing layer 24 provided in the light-transmitting portion 20 is 90° (i.e., the first absorption axis AXa1 is parallel to the vertical direction), whereas the azimuth angle of the second absorption axis AXa2 of the second polarizing layer 42 included in the optical stack 40 is 0° (i.e., the second absorption axis AXa2 is parallel to the horizontal direction). A polarization axis AXp1 of the first polarizing layer 24 is orthogonal to the first absorption axis AXa1 of the first polarizing layer 24, whereas a polarization axis AXp2 of the second polarizing layer 42 is orthogonal to the second absorption axis AXa2 of the second polarizing layer 42.

Light which is emitted from the display device 10A is linearly polarized light that has been transmitted through the front-side polarizing layer 14; therefore, its polarization direction is orthogonal to the third absorption axis AXa3 of the front-side polarizing layer 14, and is parallel to a polarization axis AXp3 of the front-side polarizing layer 14. In this example, the azimuth angle of the polarization axis AXp3 of the front-side polarizing layer 14 is 0°. When polarized light having been transmitted through the front-side polarizing layer 14 is transmitted through the phase difference layer 44 having an in-plane retardation of 4000 nm or more, its degree of polarization is reduced (i.e., depolarized). Herein, the phase difference layer 44 preferably provides a depolarization of 95% or more, and more preferably a depolarization of 99% or more; and light having received a depolarization of 99% or more (i.e., light whose degree of polarization is less than 1%) may be referred to as unpolarized light. In this example, the azimuth angle of the slow axis SXr of the phase difference layer 44 is 135°. When light having a reduced degree of polarization is incident on the second polarizing layer 42 and transmitted through the second polarizing layer 42, it becomes polarized light having a polarization direction which is parallel to the polarization axis AXp2 of the second polarizing layer 42. In other words, the light that reaches a person Pi in the space 50 is polarized light that has been transmitted through the second polarizing layer 42, i.e., polarized light whose polarization direction is parallel to the polarization axis AXp2. This polarized light allows information that is displayed on the display plane 10A to be provided to the person Pi in the space 50.

Since the polarization axis AXp2 of the second polarizing layer 42 and the first absorption axis AXa1 of the first polarizing layer 24 are parallel to each other, polarized light having been transmitted through the second polarizing layer 42 cannot be transmitted through the first polarizing layer 24. Therefore, a person Po outside the space 50 is not able to see the information being displayed on the display plane 10A. Note that even when the angle made by the first absorption axis AXa1 of the first polarizing layer 24 and the second absorption axis AXa2 of the second polarizing layer 42 is not 90°, so long as the margin of error relative to 90° is within ±10°, the displaying can be made substantially non-visible when the person Po outside the space 50 looks at the display plane 10A via the light-transmitting portion 20.

The aforementioned effect of selectively preventing only the information which is displayed on the display plane 10A from being seen by the person Po outside the space 50 is obtained irrespective of the orientation of the third absorption axis AXa3 of the front-side polarizing layer 14. When the third absorption axis AXa3 is parallel to the absorption axis AXa1 of the first polarizing layer 24, there is no need to provide the phase difference layer 44; however, in some display devices, for example, a circular polarizer (i.e., a stack of a ¼ wave plate and a linear polarizer) may be provided on the front surface, such that the absorption axis of the linear polarizer, that is, the aforementioned front-side polarizing layer has an uncertain (i.e., unknown to the user) orientation. By using the phase difference layer 44, irrespective of the polarization direction of polarized light emitted from the display device 10, the displayed information can be prevented from being seen from the outside. Furthermore, without being limited to a display device that emits linearly polarized light, as will be described later, similar effects are also obtained by using a display device that emits circularly polarized light or elliptically polarized light. Therefore, the peeking prevention system 100A provides improved convenience.

Note that the angle made by the polarization direction of the polarized light emitted from the display device 10A, i.e., the direction of the polarization axis AXp3 of the polarizing layer 14 disposed on the front surface of the display device, and the slow axis SXr of the phase difference layer 44 is, for example, preferably not less than 35° and not more than 55°, more preferably not less than 40° and not more than 50°, and most preferably approximately 45°, from the standpoint of the depolarization effect by the phase difference layer 44. Moreover, although the in-plane retardation of the phase difference layer 44 is 4000 nm or more, the greater it is, the more preferable it is; the in-plane retardation is preferably 8000 nm or more, and more preferably 10000 nm or more. Although not particularly limited, the upper limit of the in-plane retardation may be e.g. 30000 nm. While exceeding this does not affect depolarization effect, it may reduce manufacturing yield. The in-plane retardation (in-plane phase difference) is defined as $(nx-ny) \times d$, where d is the thickness of the phase difference layer; nx and ny are principal refractive indices of the phase difference layer within the plane; and nz is the principal refractive index along the normal direction.

The angle made by the slow axis SXr of the phase difference layer 44 and the absorption axis AXa2 of the second polarizing layer 42 is not particularly limited from the depolarization standpoint, and may be arbitrary. The angle made by the absorption axis AXa2 of the second polarizing layer 42 and the slow axis SXr of the phase difference layer 44 is e.g. not less than 35° and not more than 55°.

The phase difference layer 44 is obtained by drawing a polymer film (e.g., a polycarbonate film or a polyester film), for example. The materials and production methods of the first polarizing layer 24, the second polarizing layer 42, the front-side polarizing layer 14, and the rear-side polarizing layer 16 are not particularly limited; typically, they are made of polyvinyl alcohol (PVA) films containing iodine.

The peeking prevention system 100A may be in various forms of use. For example, a possible scenario is where, in addition to a display device as a shared monitor that is installed within the space 50, a display device (e.g., a laptop computer, tablet, etc.) for personal use may be brought into the space 50 to be used. Although the polarization state of polarized light emitted from the display plane differs from display device to display device, in the peeking prevention system 100A, when a display device is to be used in the space 50, there is no need to check in advance the polarization state (e.g., in the case of emitting linearly polarized light, the direction of the absorption axis of a polarizing layer which is included at the front surface of the display plane) of polarized light that is emitted by that display device from the display plane. The optical stack 40 may just be disposed and used in such a way that it is opposed to the display plane (front-side polarizing layer) of each given display device that is used in the space 50. The peeking prevention system 100A is easy to use for the person who uses it; that is, it provides good convenience.

Phase difference layers having a large in-plane retardation are being used for solving the issue where, when a display device is to be watched by using polarizing glasses, the information displayed on display plane may not be seen depending on the direction of the polarizing glasses (e.g., Japanese Patent No. 3105374, Japanese Laid-Open Patent Publication No. 2011-107198), for example. However, in a peeking prevention system according to an embodiment of the present invention, as described above, the second polarizing layer 42 is used in the space 50 together with the phase difference layer 44, for the purpose of selectively hiding the information displayed on display plane 10A from the person Po outside the space 50. In other words, light that reaches the person Pi in the space 50 (also referred to as the "viewer Pi") is not light having a reduced degree of polarization by being transmitted through the phase difference layer 44, but polarized light that is obtained as light having a reduced degree of polarization is incident on the second polarizing layer 42 and is transmitted through the second polarizing layer 42 (i.e., polarized light having a polarization direction parallel to the polarization axis AXp2 of the second polarizing layer 42). It suffices if the phase difference layer 44 and the second polarizing layer 42 are disposed between the display plane 10A and the viewer Pi in such a manner that the second polarizing layer 42 is closer to the viewer Pi than the phase difference layer 44 is. The second polarizing layer 42 and the phase difference layer 44 are attached together via an adhesion layer 43, for example.

In FIG. 1, the light-transmitting portion 20 is formed in a portion of the partition 30. The partition 30 may be made of a transparent substrate, such that the first polarizing layer 24 is provided in only a portion thereof. In this case, the portion having the first polarizing layer 24 serves as the light-transmitting portion 20. Without being limited to the illustrated example, the entire partition 30 may be composed of the light-transmitting portion 20. The first polarizing layer 24 may be provided at a side of the transparent substrate 22 facing the space 50 as illustrated, or may be provided at an opposite side of the transparent substrate 22 from the space 50.

Herein, the optical stack 40 further includes a protection layer 46 that is disposed at an opposite side of the second polarizing layer 42 from the phase difference layer 44. In other words, the optical stack 40 includes: the second polarizing layer 42; the phase difference layer 44 being disposed at the side of one principal face of the second polarizing layer 42; and the protection layer 46 being disposed at an opposite side of the second polarizing layer 42 from the phase difference layer 44. The protection layer 46 is attached onto the second polarizing layer 42 via an adhesion layer 45. The protection layer 46 and the adhesion layer 45 may be omitted. As the adhesion layers 43 and 45, adhesion layers made of an adhesive that is optically transparent (optical clear adhesive) are preferably used. The protection layer 46 is made of an acrylic resin such as PMMA, a polycarbonate-based resin, a polyvinyl chloride (PVC)-based resin, a polyethylene terephthalate-based resin (PET), or a copolymers of any of these, for example. The protection layer 46 may have a layered structure in which a plurality of resin films are layered. When the protection layer 46 is made of an acrylic resin, it is preferably produced by casting method. The thickness of the protection layer 46 is e.g. not less than 0.2 mm and not more than 5.0 mm. The in-plane retardation of the protection layer 46 is e.g. not less than 10 nm and not more than 50 nm. As the protection layer 46, for example, a Technolloy film (Technolloy is a registered trademark) manufactured by Sumika Acrylic Co., Ltd. can be used.

The method of disposing the optical stack 40 so as to be opposed to the front-side polarizing layer 14 of the display device 10A is not particularly limited. It suffices if the second polarizing layer 42 and the phase difference layer 44 are disposed so as to cover the displaying region of the display plane 10A when the display plane 10A is viewed from the light-transmitting portion 20. FIG. 2A to FIG. 2D are cross-sectional views schematically showing example methods of disposing the optical stack 40 so as to be opposed to the front-side polarizing layer 14 of the display device 10A.

Figure 2A:
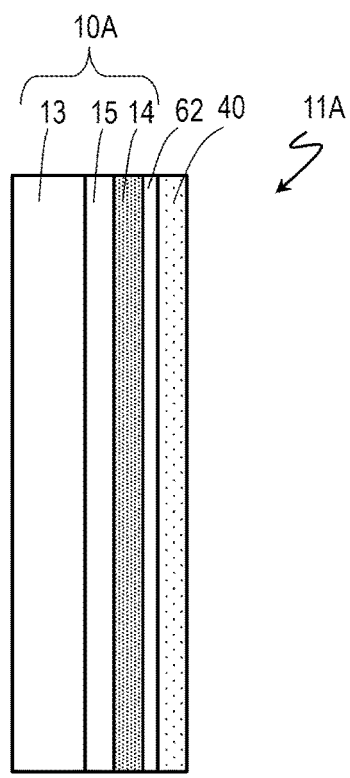
FIG. 2A A cross-sectional view schematically showing an example method of disposing an optical stack 40 so as to be opposed to a polarizing layer 14 of the display device 10A.

For example, as shown in FIG. 2A, the optical stack 40 may be bonded to the front-side polarizing layer 14 (i.e., the face of the display device 10A facing the viewer Pi) via an adhesion layer 62. Herein, the adhesion layer 62 is an adhesion layer that is removable from the display device 10A, for example. The optical stack 40 is preferably removable under a particular need which dictates that the optical stack 40 is required only when using the display device 10A within the space 50 but that the optical stack 40 is not required when the display device 10A is used outside the space 50. The display device 10A and the optical stack 40 that is attached onto the display device 10A via the adhesion layer 62 will together be referred to as a display device 11A. The display device 11A includes: the emission element layer 13; the two polarizing layers 14 and 42 provided on the viewer's side of the emission element layer 13; a ¼ wave plate 15 interposed between the emission element layer 13 and the two polarizing layers 14 and 42; and the phase difference layer 44 interposed between the two polarizing layers 14 and 42.

Figure 2B:
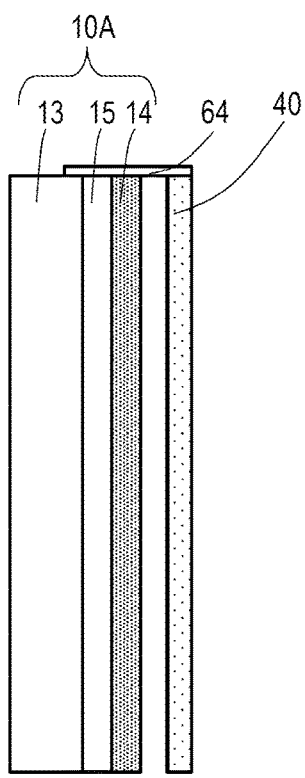
FIG. 2B A cross-sectional view schematically showing another example method of disposing the optical stack 40 so as to be opposed to the polarizing layer 14 of the display device 10A.
Figure 2C:
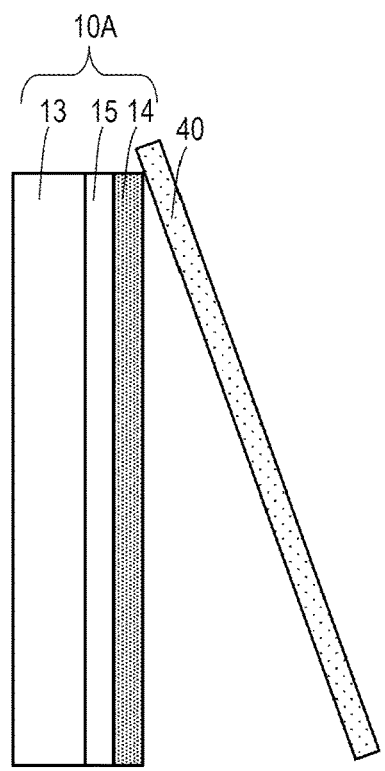
FIG. 2C A cross-sectional view schematically showing still another example method of disposing the optical stack 40 so as to be opposed to the polarizing layer 14 of the display device 10A.
Figure 2D:
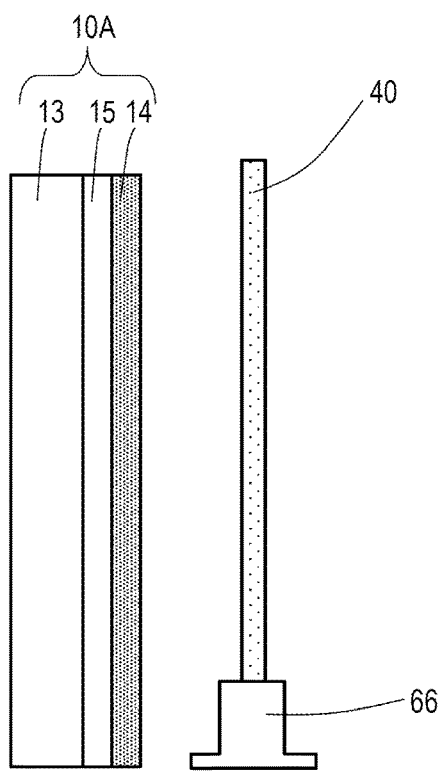
FIG. 2D A cross-sectional view schematically showing still another example method of disposing the optical stack 40 so as to be opposed to the polarizing layer 14 of the display device 10A.

Alternatively, as shown in FIG. 2B to FIG. 2D, the optical stack 40 may be disposed with an air layer (or an air gap) between itself and the display device 10A. For example, as shown in FIG. 2B, a protrusion 64 that is substantially orthogonal to a principal face of the optical stack 40, the protrusion 64 being provided in contact with one side of the optical stack 40, may be allowed to rest on the display device 10A so that the optical stack 40 becomes interposed between the display device 10A and the viewer Pi. As shown in FIG. 2C, the optical stack 40 may be leaned against the display device 10A. Alternatively, the optical stack 40 may be made in a self-standing form, and interposed between the display device 10A and the viewer Pi. For example, as shown in FIG. 2D, the optical stack 40 and a stand 66 that is capable of providing support so that a face including a principal face of the optical stack 40 contains the vertical direction may be combined.

Figure 3A:
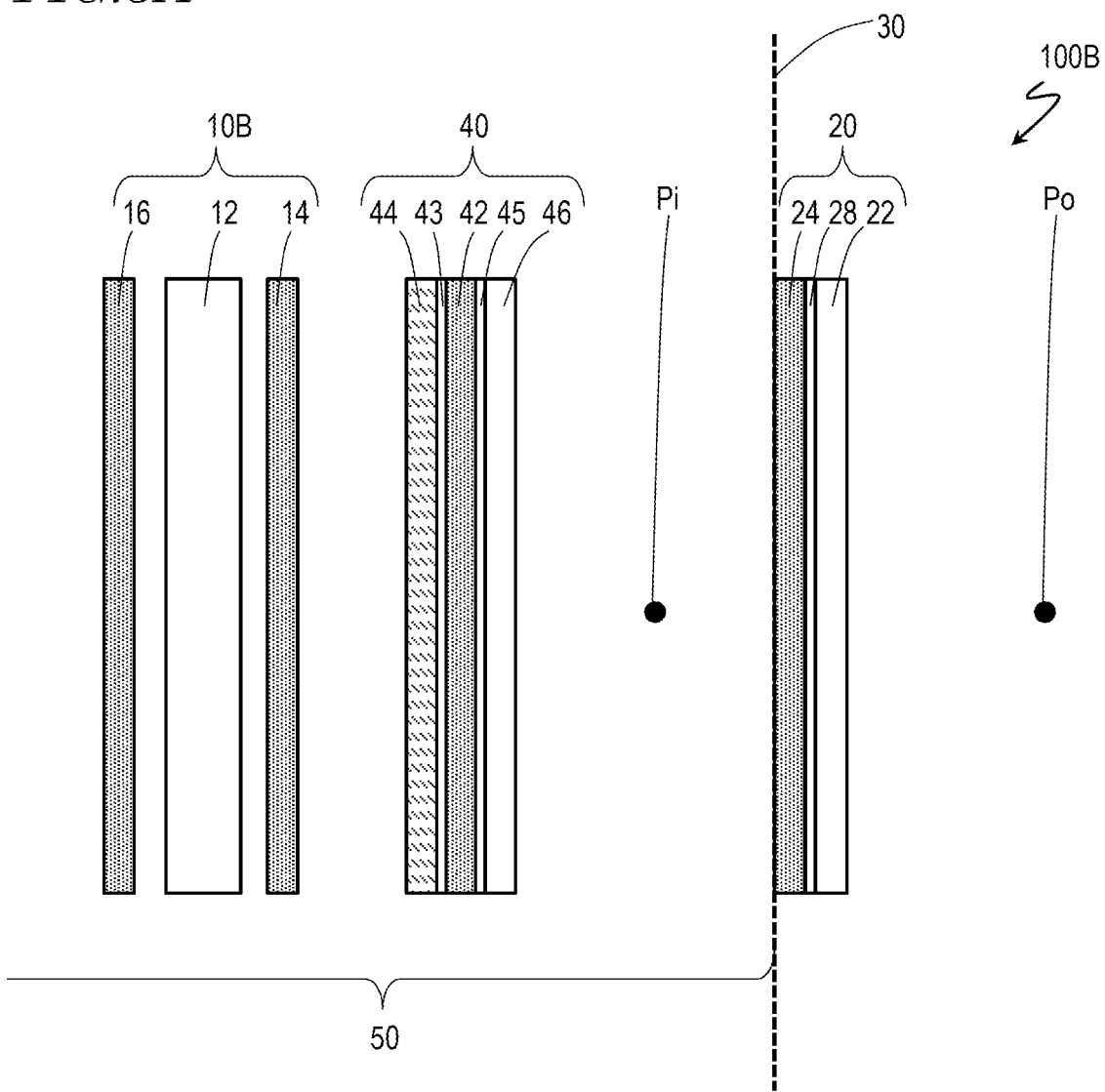
FIG. 3A A schematic plan view showing a peeking prevention system 100B according to another embodiment of the present invention as seen from above.

With reference to FIG. 3A, a peeking prevention system 100B according to another embodiment of the present invention will be described. FIG. 3A is a schematic plan view of the peeking prevention system 100B as seen from above. For those component elements which have substantially the same functions as those in the earlier embodiment, description in the earlier embodiment applies unless otherwise specified. Hereinafter, differences from the earlier embodiment will mainly be described.

The peeking prevention system 100B differs from the peeking prevention system 100A having the display device 10A in that the peeking prevention system 100B includes a liquid crystal display device 10B. The liquid crystal display device 10B includes: a liquid crystal cell 12; a polarizing layer (which may be referred to as the "front-side polarizing layer") 14 disposed on a viewer's side of the liquid crystal cell 12; and a polarizing layer (which may be referred to as the "rear-side polarizing layer") 16 disposed on the backlight (not shown) side of the liquid crystal cell 12. The liquid crystal cell 12 includes a display medium layer (i.e., a liquid crystal layer).

In the peeking prevention system 100B including the display device 10B, too, similar effects to those of the peeking prevention system 100A are obtained. Since light emitted from the display device 10B is linearly polarized light having been transmitted through the front-side polarizing layer 14, polarized light which is emitted from the display device 10B is transmitted through the phase difference layer and the polarizing layer, as is the polarized light that is emitted from the display device 10A described with reference to FIG. 1B. The orientation of the absorption axis of the front-side polarizing layer 14 may be arbitrary.

The display device to be included in the peeking prevention system according to an embodiment of the present invention is not limited to what is illustrated. There may further be a ¼ wave plate that is interposed between the front-side polarizing layer and the display medium layer. In other words, it may be a liquid crystal display device (e.g., a reflection type liquid crystal display device) having a circular polarizer at the front surface of the display plane. So long as the light that is emitted from the display device is linearly polarized light, the description of FIG. 1B applies, and therefore similar effects to those of the peeking prevention system 100A can be obtained.

Figure 3B:
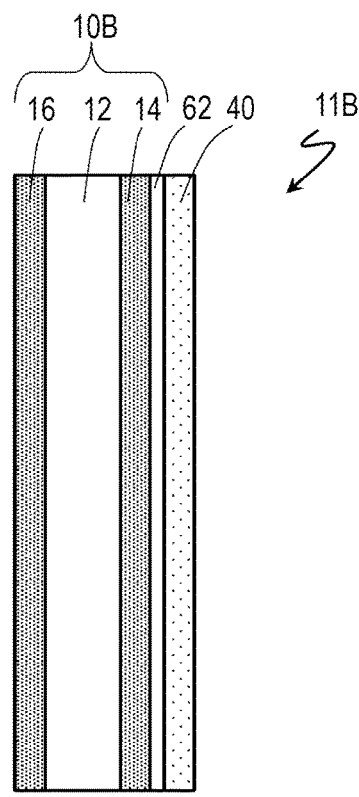
FIG. 3B A schematic diagram showing a manner in which polarized light emitted from a display device 10B is transmitted through a phase difference layer and polarizing layers.

FIG. 3B is a cross-sectional view schematically showing an example method of disposing the optical stack 40 so as to be opposed to the front-side polarizing layer 14 of the display device 10B.

As shown in FIG. 3B, the optical stack 40 may be bonded to the front-side polarizing layer 14 (the face of the display device 10B facing the viewer Pi) via an adhesion layer 62. The display device 10B and the optical stack 40 that is attached onto the display device 10B via the adhesion layer 62 will together be referred to as a display device 11B. The display device 11B includes: a display medium layer (which herein is a liquid crystal layer); two polarizing layers 14 and 42 disposed on the viewer's side of the display medium layer; and a phase difference layer 44 interposed between the two polarizing layers 14 and 42. Although omitted from illustration, a ¼ wave plate may be further included between the front-side polarizing layer 14 and the display medium layer (which herein is a liquid crystal layer).

Although omitted from illustration, the method of disposing the optical stack 40 so as to be opposed to the front-side polarizing layer 14 as illustrated in FIG. 2B to FIG. 2D is also applicable to the display device 10B.

As described above, from the standpoint of depolarization by the phase difference layer 44, the angle made by the polarization direction of the polarized light emitted from the display device 10B, i.e., the direction of the polarization axis AXp3 of the polarizing layer 14 disposed on the front surface of the display device, and the slow axis SXr of the phase difference layer 44 is preferably not less than 35° and not more than 55°. However, embodiments of the present invention are not limited thereto.

Figure 3C:
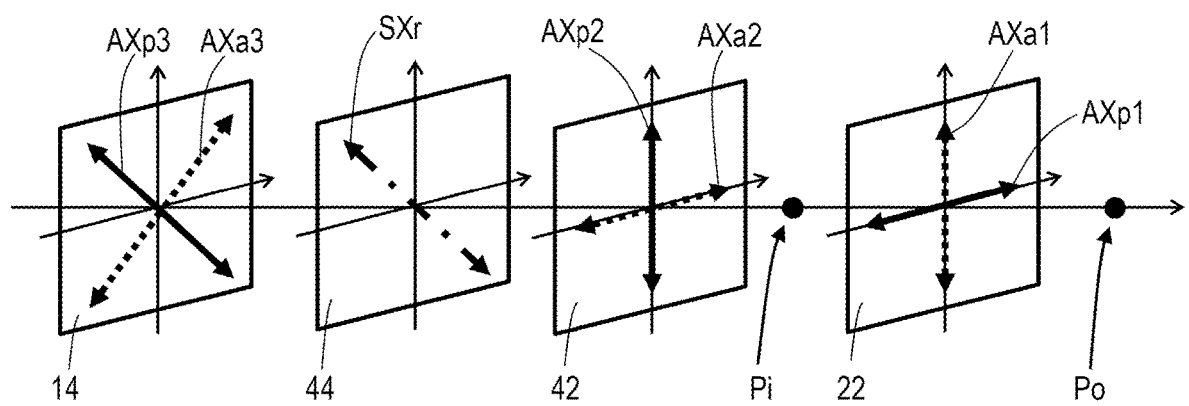
FIG. 3C A cross-sectional view schematically showing an example method of disposing an optical stack 40 so as to be opposed to a polarizing layer 14 of the display device 10B.

FIG. 3C schematically illustrates a manner in which polarized light emitted from a TN (Twisted Nematic) mode liquid crystal display device 10B, as an example of the liquid crystal display device 10B, is transmitted through a phase difference layer and polarizing layers. In this example, the azimuth angle of the third absorption axis AXa3 of the front-side polarizing layer 14 is 45°. The orientations of the slow axis SXr of the phase difference layer 44, the second absorption axis AXa2 of the second polarizing layer 42, and the first absorption axis AXa1 of the first polarizing layer 24 are identical to those in the example depicted in FIG. 1B. In this example, the third absorption axis AXa3 of the front-side polarizing layer 14 is parallel to the slow axis SXr of the phase difference layer 44. Therefore, polarized light having been transmitted through the front-side polarizing layer 14 is not depolarized even if it is transmitted through the phase difference layer 44 having an in-plane retardation of 4000 nm or more; however, as described below, an effect of preventing information which is displayed on a display plane 10B from being seen by the person Po outside the space 50 can be obtained.

When light transmitted through the phase difference layer 44 is transmitted through the second polarizing layer 42, as in the case of FIG. 1B, it becomes polarized light having a polarization direction which is parallel to the polarization axis AXp2 of the second polarizing layer 42. The light that reaches a person Pi in the space 50 is polarized light that has been transmitted through the second polarizing layer 42, i.e., polarized light whose polarization direction is parallel to the polarization axis AXp2. This polarized light allows information that is displayed on the display plane 10B to be provided to the person Pi in the space 50. Since the polarization axis AXp2 of the second polarizing layer 42 and the first absorption axis AXa1 of the first polarizing layer 24 are parallel to each other, polarized light having been transmitted through the second polarizing layer 42 cannot be transmitted through the first polarizing layer 24. Therefore, a person Po outside the space 50 is not able to see the information being displayed on the display plane 10B.

Figure 4A:
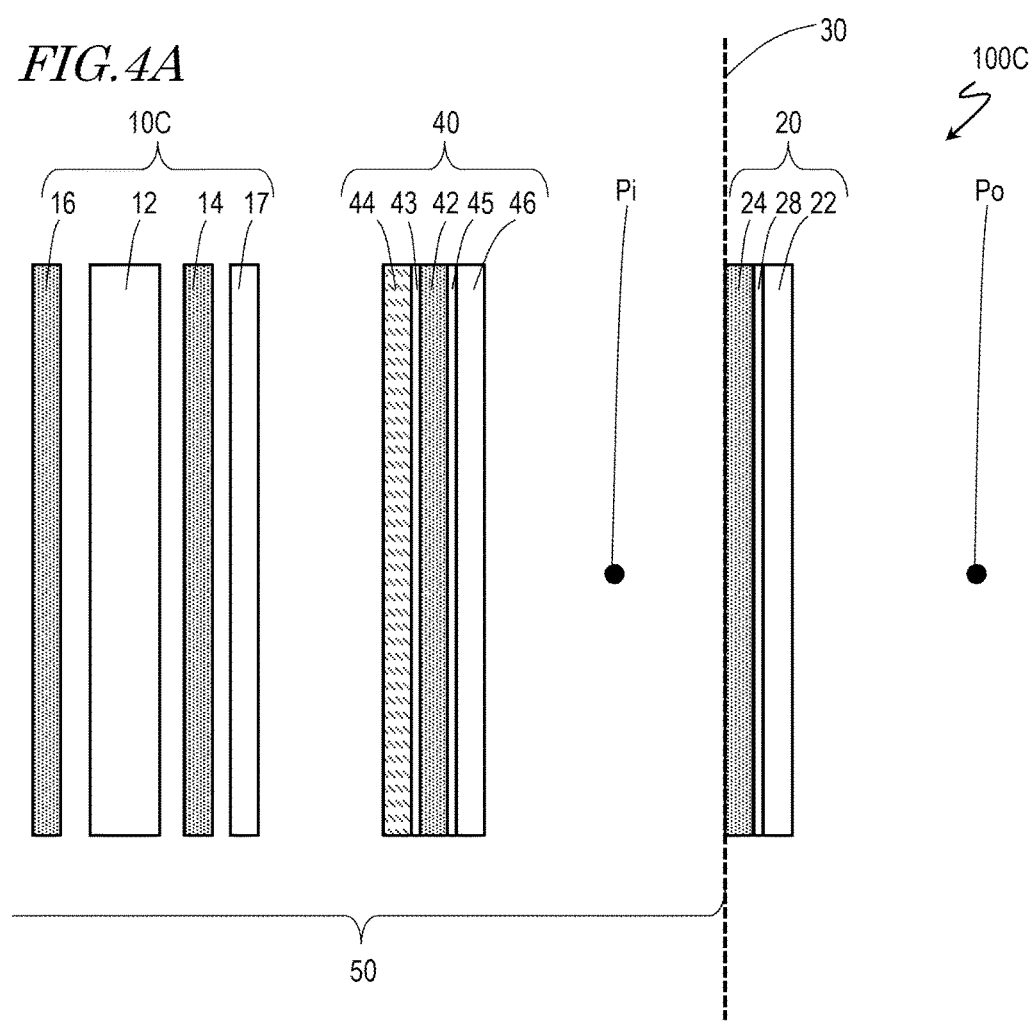
FIG. 4A A schematic plan view showing a peeking prevention system 100C according to still another embodiment of the present invention as seen from above.

With reference to FIG. 4A, a peeking prevention system 100C according to still another embodiment of the present invention will be described. FIG. 4A is a schematic plan view of the peeking prevention system 100C as seen from above. Whereas the display devices 10A and 10B respectively included in the above-described peeking prevention systems 100A and 100B have a display plane through which linearly polarized light is emitted, a display device 10C included in the peeking prevention system 100C has a display plane through which circularly polarized light or elliptically polarized light is emitted. For example, liquid crystal display devices are known in which a ¼ wave plate or a phase difference layer having a large retardation is disposed further outside of the front-side polarizing layer, so that displaying will be seen even through polarizing sunglasses. Disposing a phase difference layer which has a larger in-plane retardation than that of a ¼ wave plate outside of the front-side polarizing layer can also suppress coloring (coloration) when being seen through polarizing sunglasses.

The liquid crystal display device 10C includes a phase difference layer (which may be referred to as the "second phase difference layer") 17 at the front surface of the display plane. The liquid crystal display device 10C further includes: a liquid crystal cell 12; a front-side polarizing layer 14 disposed on the viewer's side of the liquid crystal cell 12; and a rear-side polarizing layer 16 disposed on the backlight (not shown) side of the liquid crystal cell 12. The phase difference layer 17 is disposed on the viewer's side of the front-side polarizing layer 14. The front-side polarizing layer 14 and the phase difference layer 17 together function as a circular polarizer or an elliptical polarizer, such that circularly polarized light or elliptically polarized light is emitted through the display plane of the display device 10C. For example, when the phase difference layer 17 is a λ/4 layer (¼ wave plate) 17 and the angle made by the slow axis of the phase difference layer 17 and the polarization axis of the front-side polarizing layer 14 is 45°, the front-side polarizing layer 14 and the phase difference layer 17 together function as a circular polarizer.

In the peeking prevention system 100C, too, as in the earlier embodiment, an effect of preventing information which is displayed on a display plane 10C from being seen by the person Po outside the space 50 can be obtained.

Furthermore, because polarized light having been transmitted through the phase difference layer 17 is transmitted through the phase difference layer 44 having an in-plane retardation of 4000 nm or more, an effect of reducing the degree of polarization (depolarizing) is also obtained. The angle made by the slow axis of the phase difference layer 17 and the slow axis of the phase difference layer 44 may be set arbitrarily, without particular limitation. The phase difference layer 17 may have a greater in-plane retardation than that of a ¼ wave plate. The in-plane retardation of the phase difference layer 17 is e.g. 1000 nm or less.

Figure 4B:
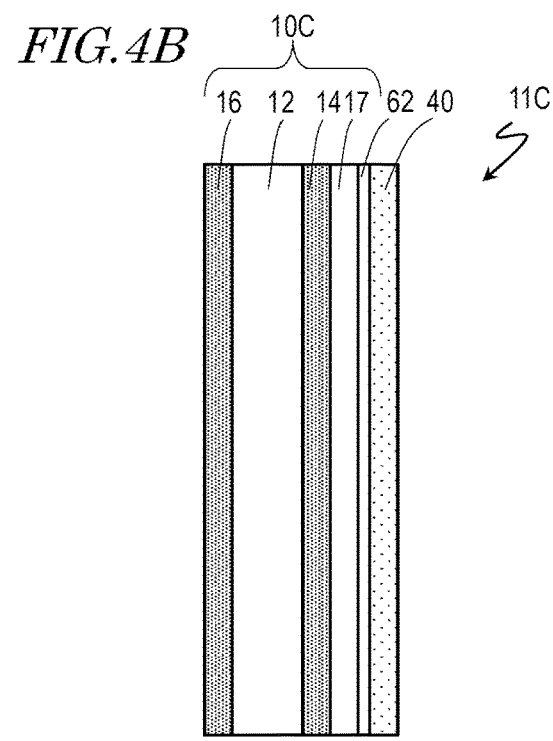
FIG. 4B A cross-sectional view schematically showing an example method of disposing an optical stack 40 so as to be opposed to a phase difference layer 17 of the display device 10C.

FIG. 4B is a cross-sectional view schematically showing an example method of disposing the optical stack 40 so as to be opposed to the phase difference layer 17 of the display device 10C.

As shown in FIG. 4B, the optical stack 40 may be bonded to the phase difference layer 17 (the face of the display device 10C facing the viewer Pi) via an adhesion layer 62. The display device 10C and the optical stack 40 that is attached onto the display device 10C via the adhesion layer 62 will together be referred to as a display device 11C. The display device 11C includes: a display medium layer (which herein is a liquid crystal layer); two polarizing layers 14 and 42 disposed on the viewer's side of the display medium layer; a phase difference layer 44 interposed between the two polarizing layers 14 and 42; and a phase difference layer 17 interposed between the closer polarizing layer 14 to the display medium layer between the two polarizing layers 14 and 42 and the phase difference layer 44.

Although omitted from illustration, the method of disposing the optical stack 40 so as to be opposed to the display plane of the display device as illustrated in FIG. 2B to FIG. 2D is also applicable to the display device 10C.

Experimental Example will be described below.

Experimental Example 1

In order to examine how the display plane 10A of the peeking prevention system 100A appears to the person (viewer) Pi in the space 50, the transmittance of light from a light source which has been transmitted through the front-side polarizing layer 14, the phase difference layer 44, and the second polarizing layer 42 in this order was measured for different wavelengths. The in-plane retardation value of the phase difference layer 44 was varied to examine changes in the transmittance. The measurements were taken by using a UV-Vis-NIR spectrophotometer V-660 manufactured by Japan Spectroscopic Company. Using a halogen lamp as the light source, transmittances at wavelengths from 380 nm to 780 nm were measured at 1 nm intervals, with a scanning rate of 400 nm/min. By using the transmittance polarized light that has been transmitted only through the front-side polarizing layer 14 from the light source as a blank, baseline correction was performed. In other words, the resultant transmittance was normalized against the transmittance of linearly polarized light that has been transmitted only through the front-side polarizing layer 14 from the light source as 100%.

Figure 5A:
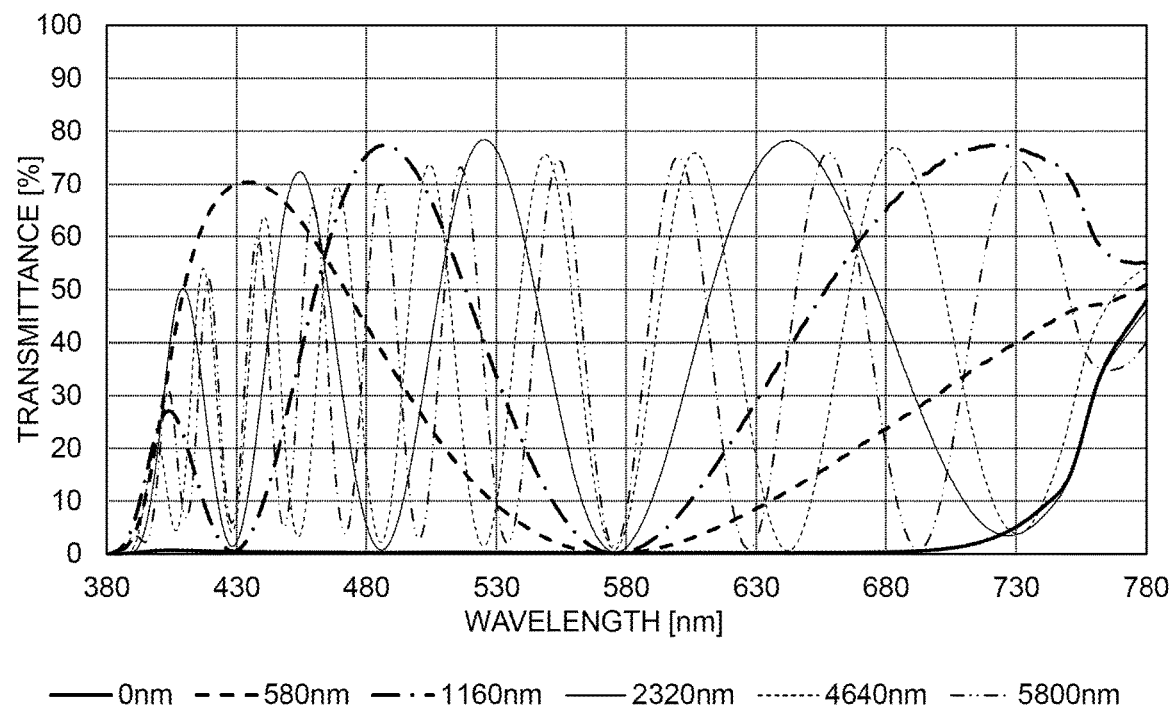
FIG. 5A A graph showing wavelength dependence of transmittance in Experimental Example 1.
Figure 5B:
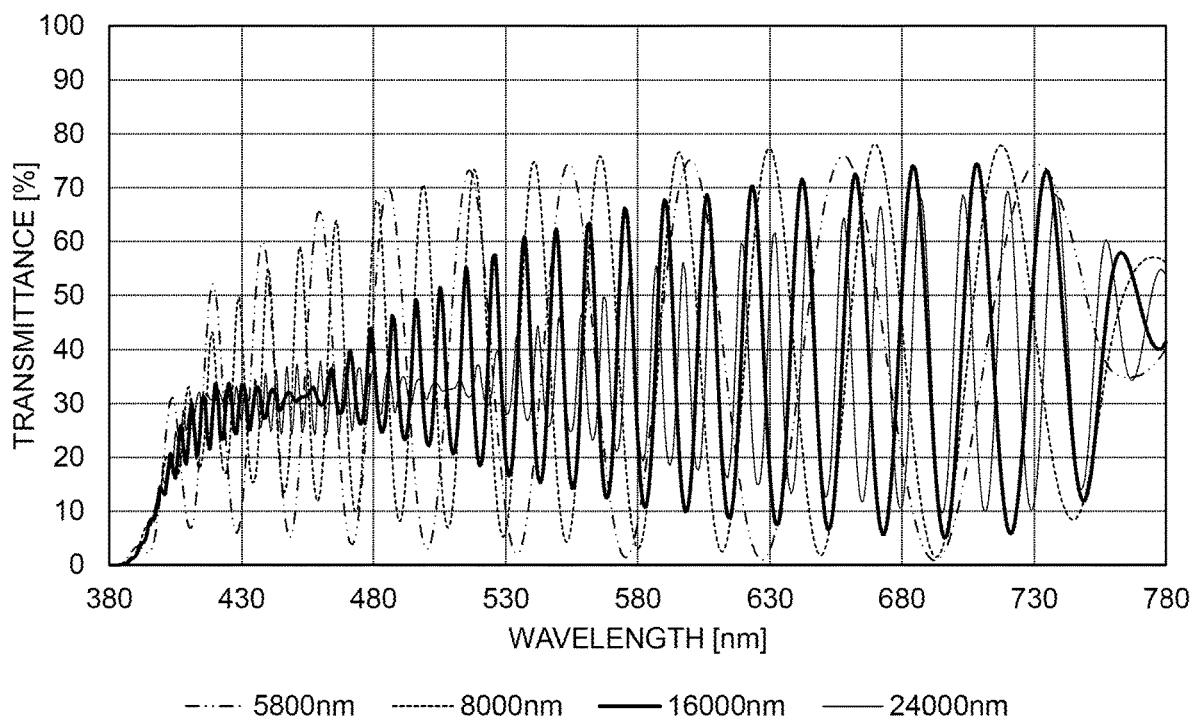
FIG. 5B A graph showing wavelength dependence of transmittance in Experimental Example 1.
Figure 5C:
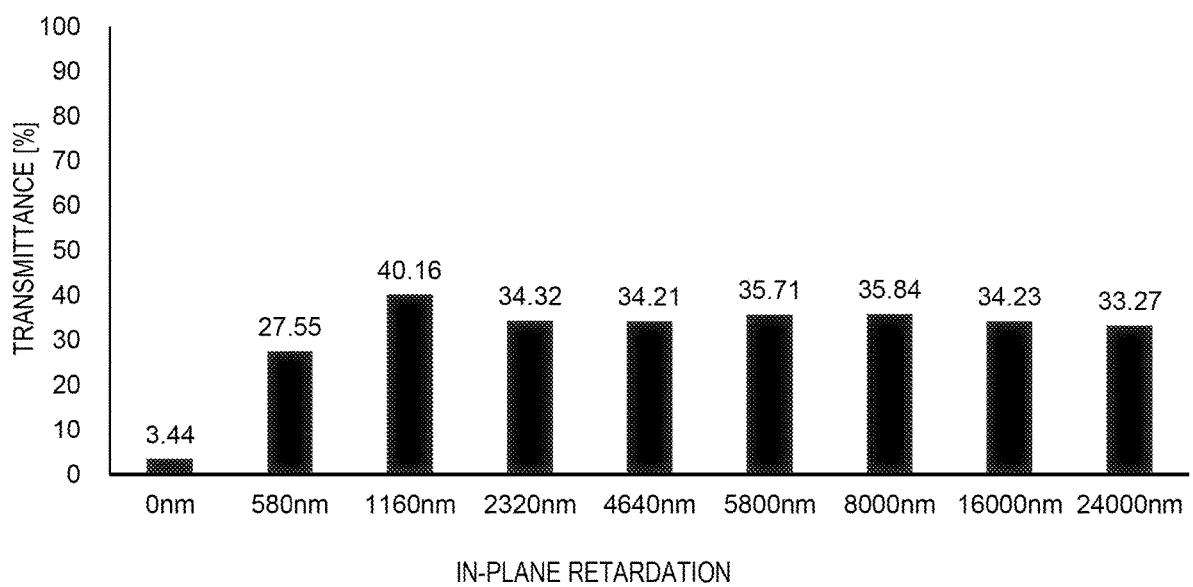
FIG. 5C A graph showing mean values of transmittance across the entire visible light region (from 380 nm to 780 nm) in Experimental Example 1.

The conditions of the polarizing layers and phase difference layer in the measurement system are shown below. FIG. 5A and FIG. 5B are graphs showing wavelength dependence of transmittance, and FIG. 5C is a graph showing mean values of transmittance across the entire visible light region (from 380 nm to 780 nm).

absorption axis AXa3 of the front-side polarizing layer 14: azimuth angle 90° (vertical direction)

slow axis SXr of the phase difference layer 44: azimuth angle 45° absorption axis AXa2 of the second polarizing layer 42: azimuth angle 0° (horizontal direction)

Experimental Example 2

Figure 6A:
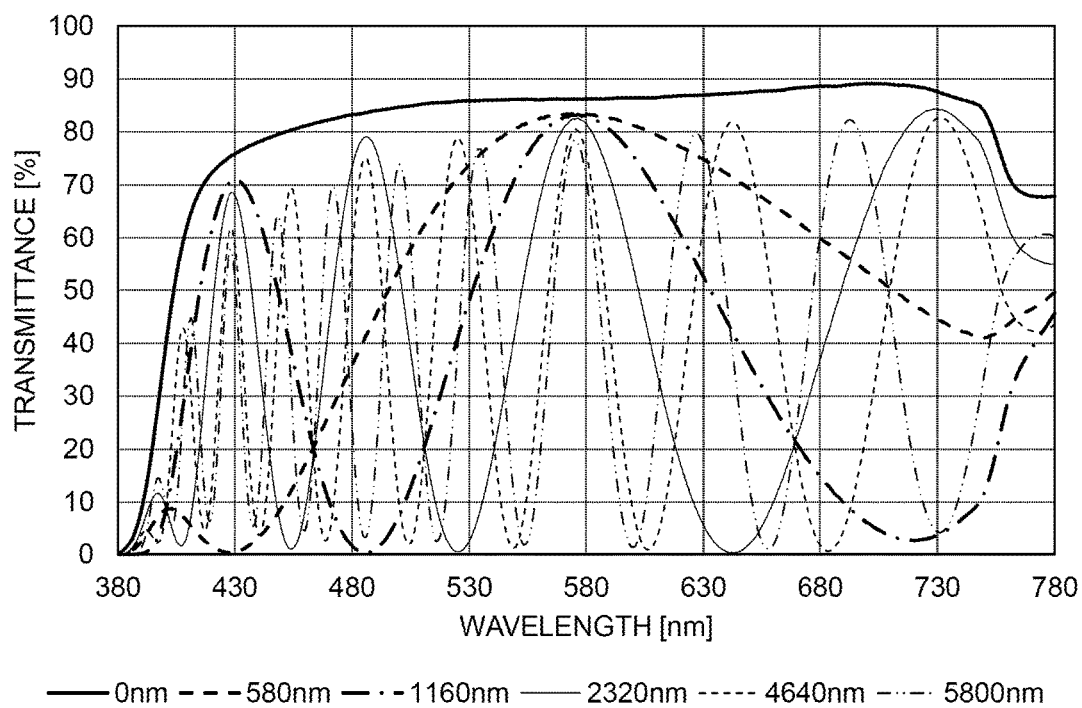
FIG. 6A A graph showing wavelength dependence of transmittance in Experimental Example 2.

Except for the following conditions, measurements were taken similarly to Experimental Example 1. FIG. 6A and FIG. 6B are graphs showing wavelength dependence of transmittance, and FIG. 6C is a graph showing mean values of transmittance across the entire visible light region (from 380 nm to 780 nm).

absorption axis AXa3 of the front-side polarizing layer 14: azimuth angle 0° (horizontal direction)

slow axis SXr of the phase difference layer 44: azimuth angle 45° absorption axis AXa2 of the second polarizing layer 42: azimuth angle 0° (horizontal direction)

Experimental Example 3

Figure 7A:
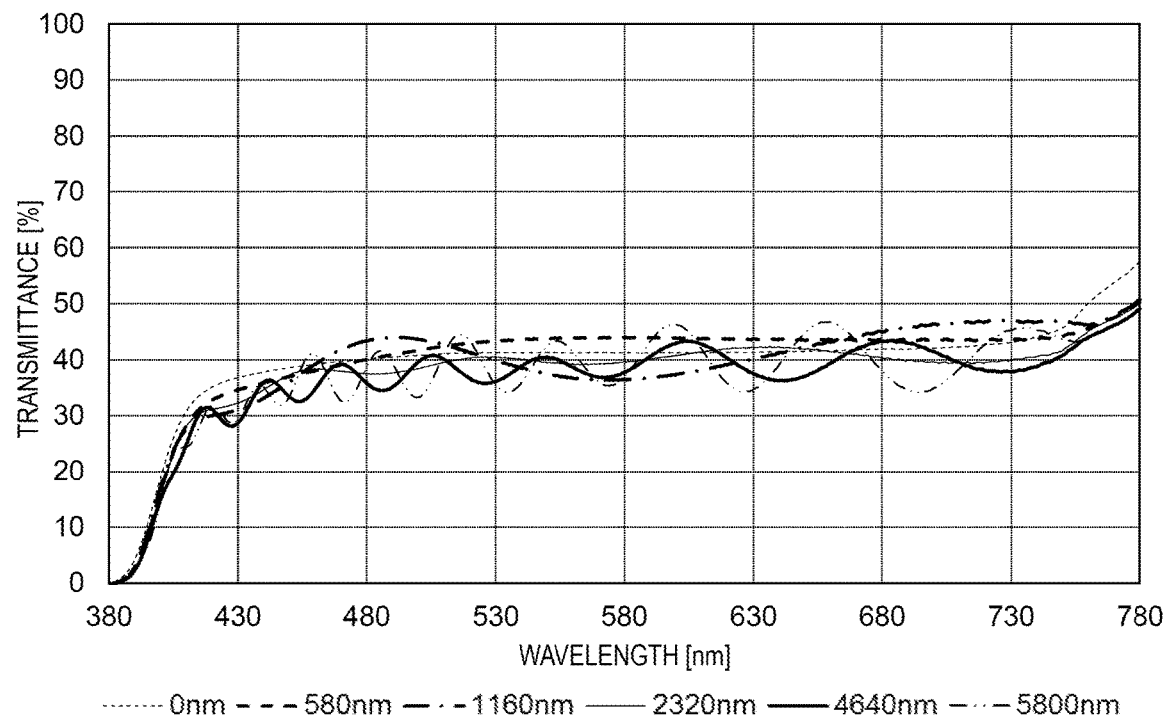
FIG. 7A A graph showing wavelength dependence of transmittance in Experimental Example 3.
Figure 7B:
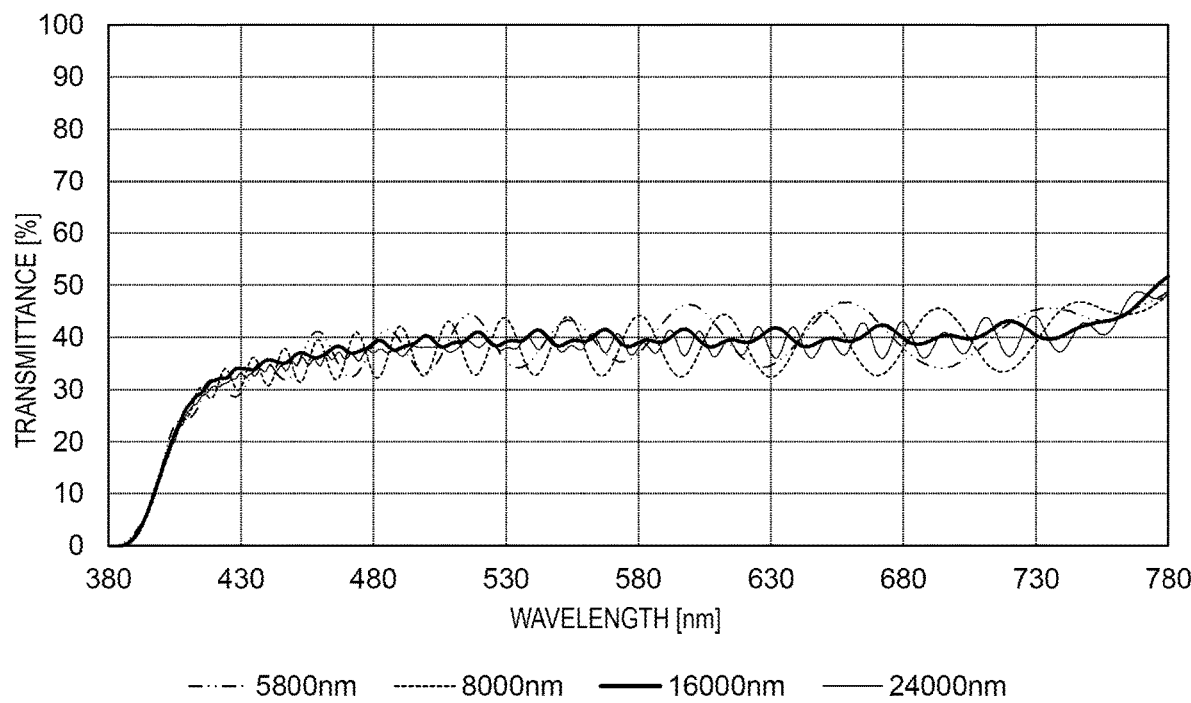
FIG. 7B A graph showing wavelength dependence of transmittance in Experimental Example 3.
Figure 7C:
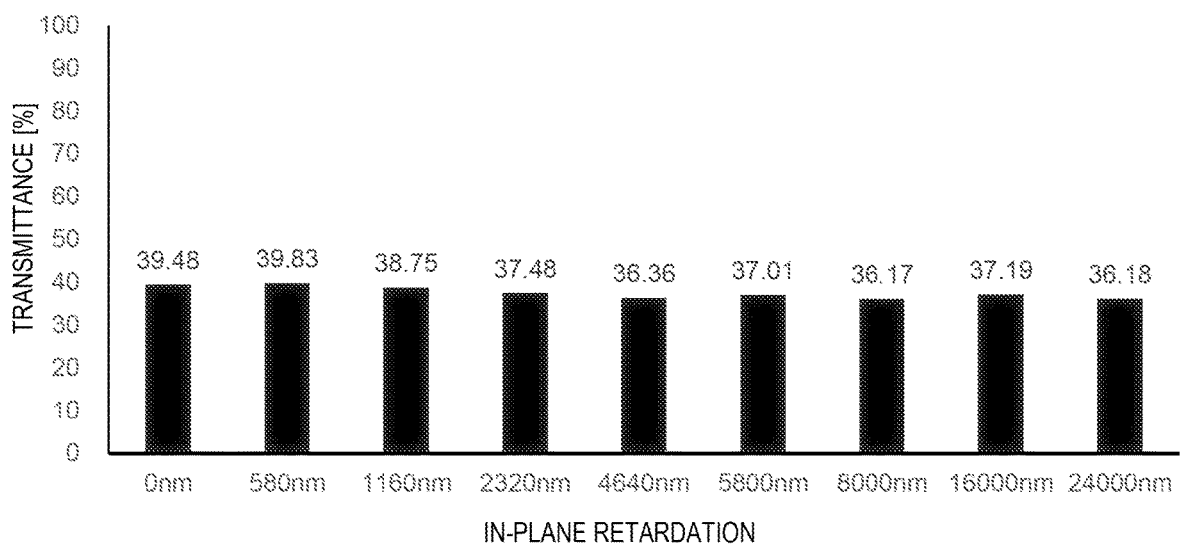
FIG. 7C A graph showing mean values of transmittance across the entire visible light region (from 380 nm to 780 nm) in Experimental Example 3.

Except for the following conditions, measurements were taken similarly to Experimental Example 1. FIG. 7A and FIG. 7B are graphs showing wavelength dependence of transmittance, and FIG. 7C is a graph showing mean values of transmittance across the entire visible light region (from 380 nm to 780 nm).

absorption axis AXa3 of the front-side polarizing layer 14: azimuth angle 45° slow axis SXr of the phase difference layer 44: azimuth angle 135° (−45°)

absorption axis AXa2 of the second polarizing layer 42: azimuth angle 0° (horizontal direction)

Experimental Example 4

Figure 8A:
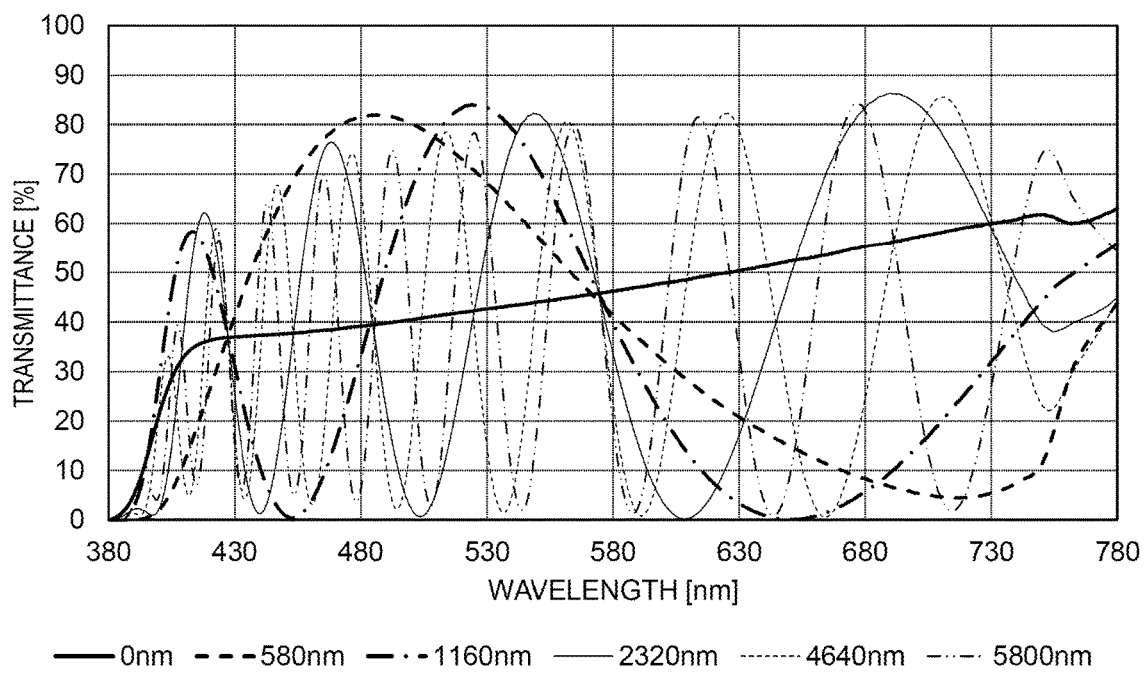
FIG. 8A A graph showing wavelength dependence of transmittance in Experimental Example 4.
Figure 8B:
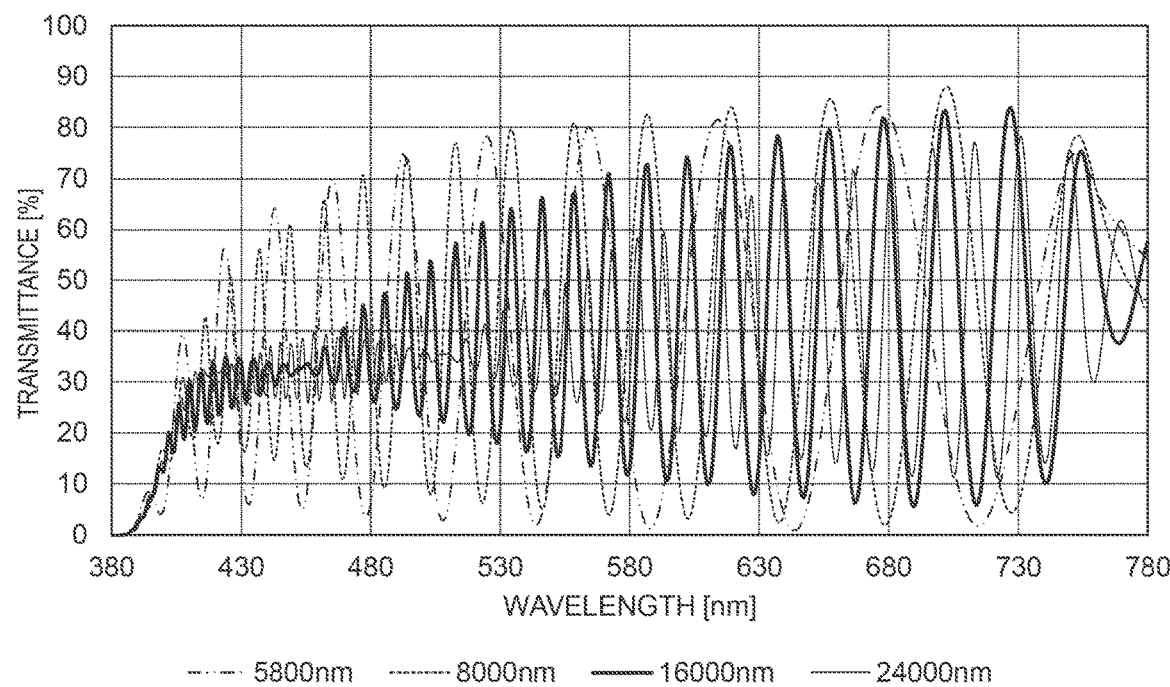
FIG. 8B A graph showing wavelength dependence of transmittance in Experimental Example 4.
Figure 8C:
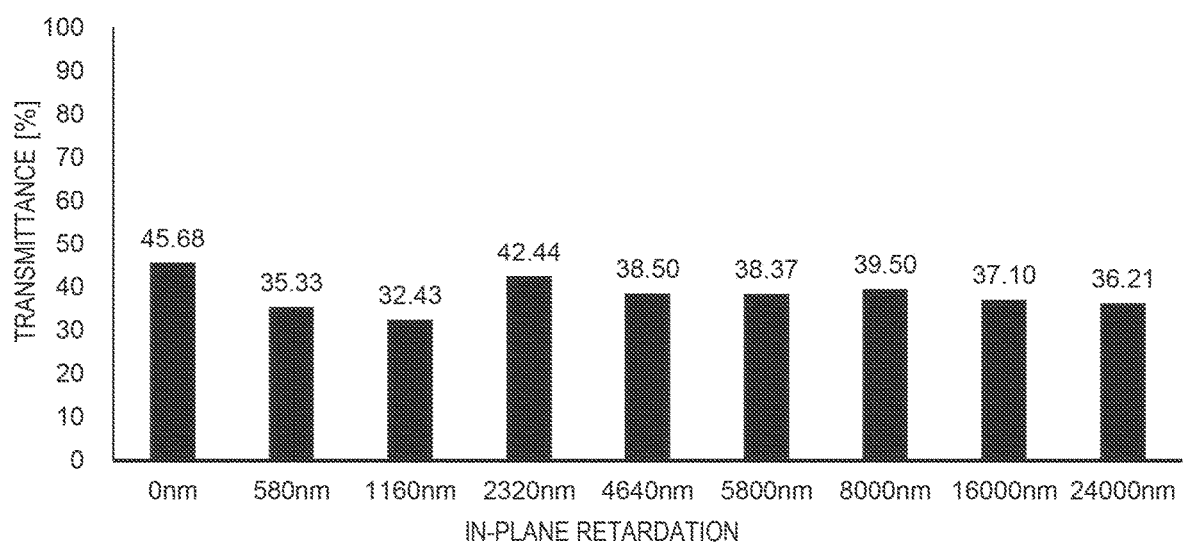
FIG. 8C A graph showing mean values of transmittance across the entire visible light region (from 380 nm to 780 nm) in Experimental Example 4.

In order to examine how the display plane 10C of the peeking prevention system 100C appears to the viewer Pi, the transmittance of light from a light source which has been transmitted through the front-side polarizing layer 14, the phase difference layer (λ/4 layer) 17, the phase difference layer 44, and the second polarizing layer 42 in this order was measured for different wavelengths. Except for the following conditions, measurements were taken similarly to Experimental Example 1. FIG. 8A and FIG. 8B are graphs showing wavelength dependence of transmittance, and FIG. 8C is a graph showing mean values of transmittance across the entire visible light region (from 380 nm to 780 nm).

absorption axis AXa3 of the front-side polarizing layer 14: azimuth angle 0° slow axis of the ¼ layer 17: azimuth angle 45° slow axis SXr of the phase difference layer 44: azimuth angle 45° absorption axis AXa2 of the second polarizing layer 42: azimuth angle 0° (horizontal direction)

Experimental Examples 1 to 3 correspond to the case where the polarized light emitted from the display device is linearly polarized light, whereas Experimental Example 4 corresponds to the case where the polarized light emitted from the display device is circularly polarized light. In Experimental Examples 1 to 3, the azimuth angle of the absorption axis AXa2 of the second polarizing layer 42 was all 0°, while the polarization direction of the linearly polarized light emitted from the display device, i.e., the absorption axis AXa3 of the front-side polarizing layer 14, was oriented differently from one another. Among these, in Experimental Examples 1 and 2, the angle made by the absorption axis AXa3 of the front-side polarizing layer 14 and the slow axis SXr of the phase difference layer 44 was 45°; in Experimental Example 3, the angle made by the absorption axis AXa3 of the front-side polarizing layer 14 and the slow axis SXr of the phase difference layer 44 was 90°. In the configuration of Experimental Example 3, depolarization effect by the phase difference layer 44 is not obtained.

Mean values of transmittance across the visible light region in Experimental Example 3 (FIG. 7C) have little change depending on the in-plane retardation value of the phase difference layer 44. On the other hand, it can be seen that mean values of transmittance across the visible light region in Experimental Examples 1 and 2 (FIG. 5C and FIG. 6C) have resulted in some variation in transmittance depending on the different orientations of the absorption axis AXa3 of the front-side polarizing layer 14 when the in-plane retardation of the phase difference layer 44 is 2320 nm or less, but that there is little difference in transmittance depending on the orientation of the absorption axis AXa3 of the front-side polarizing layer 14 when the in-plane retardation of the phase difference layer 44 is 4640 nm or more. Therefore, when the in-plane retardation of the phase difference layer 44 is 4640 nm or more, it can be said that the polarized light having been transmitted through the front-side polarizing layer 14 is depolarized irrespective of the direction of the polarization axis of the front-side polarizing layer 14. It can also be seen that in Experimental Examples 1 and 2 (FIG. 5C and FIG. 6C), the transmittance of the case where the in-plane retardation of the phase difference layer 44 is 4640 nm or more has little difference from the transmittance of Experimental Example 3 (FIG. 7C). The mean values of transmittance across the visible light region in Experimental Example 4 (FIG. 8C) also have little difference from those of Experimental Examples 1 to 3 when the in-plane retardation of the phase difference layer 44 is 4640 nm or more.

From the wavelength dependence of transmittance indicated in FIG. 5A to FIG. 8A and FIG. 5B to FIG. 8B, it can be seen that the intervals between peaks of transmittance become narrower in all of Experimental Examples 1 to 4 as the in-plane retardation of the phase difference layer 44 increases. It is considered that the degree of tinting or rainbow pattern observed when the viewer Pi views the display plane 10A or 10C becomes smaller as the interval between peaks of transmittance increases. In the configuration of each of Experimental Examples 1 to 4, sensory evaluations of the degree of tinting or rainbow pattern when the viewer Pi views the display plane 10A were made, which exhibited significant differences between the cases where the in-plane retardation of the phase difference layer 44 was 2320 nm and 4640 nm.

INDUSTRIAL APPLICABILITY

A peeking prevention system and a method of peeking prevention, as well as an optical stack and a display device suitable for use therewith, according to embodiments of the present invention are easy for the user to use.

REFERENCE SIGNS LIST 10A, 10B, 10C display device (display plane)
12 liquid crystal cell
13 emission element layer
14 front-side polarizing layer
15 λ/4 layer
16 rear-side polarizing layer
17 phase difference layer
20 light-transmitting portion
22 transparent substrate
24 first polarizing layer
30 partition
40 optical stack
42 second polarizing layer
44 phase difference layer
50 space
100A, 100B, 100C peeking prevention system

The invention claimed is:

1. A peeking prevention system comprising:
a display device having a display plane from which to emit polarized light;
a partition to delimit from surroundings a space in which displaying is to be provided by the display device, the partition having a light-transmitting portion through which the inside of the space is viewable; and
an optical stack opposed to the display plane of the display device, wherein,
the light-transmitting portion includes a transparent substrate and a first polarizing layer, the first polarizing layer having a first absorption axis that is parallel to a first direction;
the optical stack includes
a second polarizing layer having a second absorption axis that is parallel to a second direction, the second direction being orthogonal to the first direction, and
a first phase difference layer disposed at a side of the second polarizing layer facing the display plane; and
the first phase difference layer has an in-plane retardation of 4000 nm or more, and
wherein the second polarizing layer and the first phase difference layer are attached together via a first adhesion layer.

2. The peeking prevention system of claim 1, wherein the optical stack further includes a protection layer disposed at an opposite side of the second polarizing layer from the first phase difference layer.

3. The peeking prevention system of claim 1, wherein the optical stack is disposed with an air layer between itself and the display device.

4. The peeking prevention system of claim 1, wherein,
the display device includes a third polarizing layer on a front surface of the display plane; and
the third polarizing layer has a third absorption axis that is parallel to a third direction, the third direction not being orthogonal to the first direction.

5. The peeking prevention system of claim 4, wherein the third direction is parallel to the first direction.

6. The peeking prevention system of claim 4, wherein an angle made by the third direction and the first direction is 45°.

7. The peeking prevention system of claim 4, wherein the display device further includes a ¼ wave plate interposed between the third polarizing layer and a display medium layer or an emission element layer.

8. The peeking prevention system of claim 4, wherein the optical stack is bonded to the third polarizing layer via a second adhesion layer.

9. The peeking prevention system of claim 1, wherein,
the display device includes a second phase difference layer on a front surface of the display plane; and
the display device further includes a third polarizing layer interposed between a display medium layer and the second phase difference layer.

10. The peeking prevention system of claim 9, wherein the optical stack is bonded to the second phase difference layer via a second adhesion layer.

11. The peeking prevention system of claim 1, wherein an angle made by a slow axis of the first phase difference layer and the second direction is not less than 35° and not more than 55°.

12. The optical stack for use in the peeking prevention system of claim 1.

13. A display device comprising:
a display medium layer or an emission element layer;
two polarizing layers disposed at a viewer's side of the display medium layer or emission element layer; and
a first phase difference layer being interposed between the two polarizing layers and having an in-plane retardation of 4000 nm or more,
wherein one of the two polarizing layers that is closer to the viewer and the first phase difference layer are attached together via an adhesion layer.

14. The display device of claim 13, further comprising a second phase difference layer interposed between: one of the two polarizing layers that is closer to the display medium layer or emission element layer; and the first phase difference layer.

15. The display device of claim 13, further comprising a ¼ wave plate interposed between the display medium layer or emission element layer and the two polarizing layers.

16. A method of peeking prevention for use with a peeking prevention system that includes:
a display device; and
a partition to delimit from surroundings a space in which displaying is to be provided by the display device, the partition having a light-transmitting portion through which the inside of the space is viewable,
the light-transmitting portion including: a transparent substrate; and a first polarizing layer being disposed at a side of the transparent substrate facing the space and having a first absorption axis parallel to a first direction,
wherein the method comprises
disposing an optical stack so as to be opposed to a display plane of the display device, to reduce a transmittance when the display plane is viewed through the light-transmitting portion, the optical stack including: a second polarizing layer having a second absorption axis that is parallel to a second direction, the second direction being orthogonal to the first direction; and a phase difference layer being disposed at a side of the second polarizing layer facing the display plane and having an in-plane retardation of 4000 nm or more,
wherein the second polarizing layer and the phase difference layer are attached together via an adhesion layer.

* * * * *